No. 685,184. Patented Oct. 22, 1901.
H. M. SMITH.
AMALGAMATOR.
(Application filed Apr. 13, 1901.)
(No Model.) 2 Sheets—Sheet 1.

WITNESSES:
Donn Twitchell
C. R. Ferguson

INVENTOR
Hugh M. Smith
By
ATTORNEYS

No. 685,184. Patented Oct. 22, 1901.
H. M. SMITH.
AMALGAMATOR.
(Application filed Apr. 13, 1901.)
(No Model.) 2 Sheets—Sheet 2.

WITNESSES:
Donn Twitchell
C. R. Ferguson

INVENTOR
Hugh M. Smith
BY
ATTORNEYS

UNITED STATES PATENT OFFICE.

HUGH M. SMITH, OF LIBBY, MONTANA, ASSIGNOR OF ONE-HALF TO RALPH SAILEY, OF LIBBY, MONTANA.

AMALGAMATOR.

SPECIFICATION forming part of Letters Patent No. 685,184, dated October 22, 1901.

Application filed April 13, 1901. Serial No. 55,674. (No model.)

*To all whom it may concern:*

Be it known that I, HUGH M. SMITH, a citizen of the United States, and a resident of Libby, in the county of Flathead and State of Montana, have invented a new and Improved Amalgamator, of which the following is a full, clear, and exact description.

This invention relates to improvements in amalgamators for separating metals from ores; and the object is to provide a shaking amalgamating-pan of simple construction so arranged that the pan may be easily removed from its supporting-frame, but when in place it will be held perfectly solid.

I will describe an amalgamator embodying my invention, and then point out the novel features in the appended claims.

Reference is to be had to the accompanying drawings, forming a part of this specification, in which similar characters of reference indicate corresponding parts in all the figures.

Figure 1:
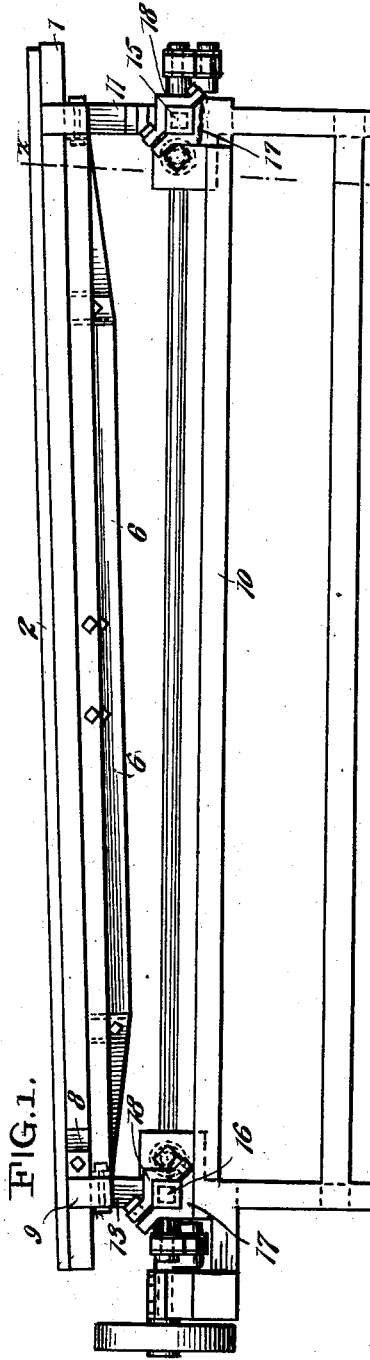
Figure 3:
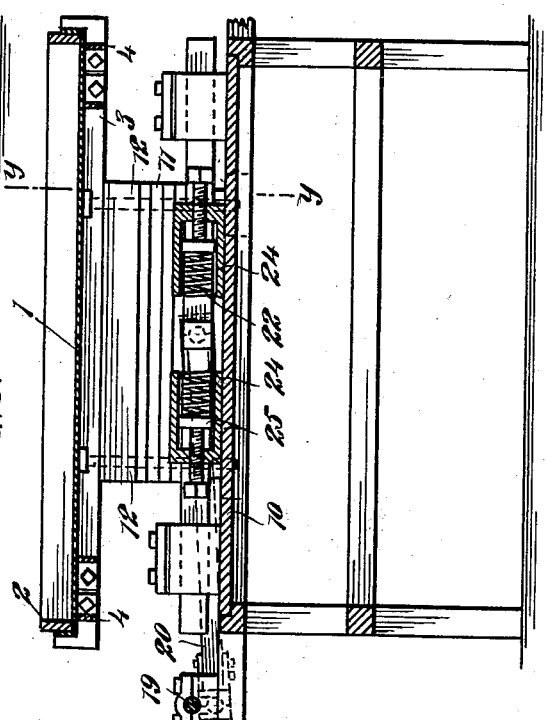
Figure 2:
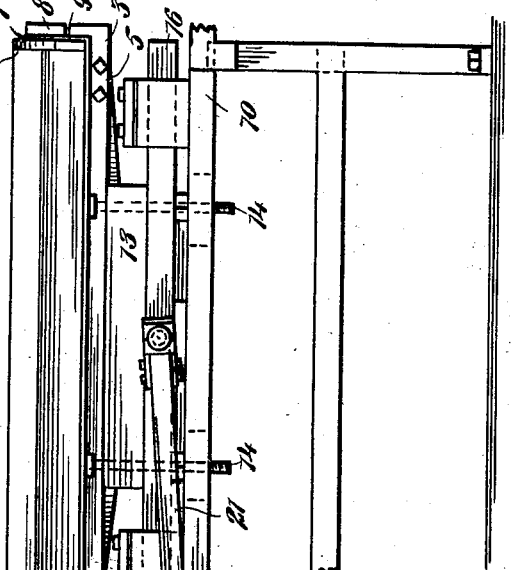
Figure 4:
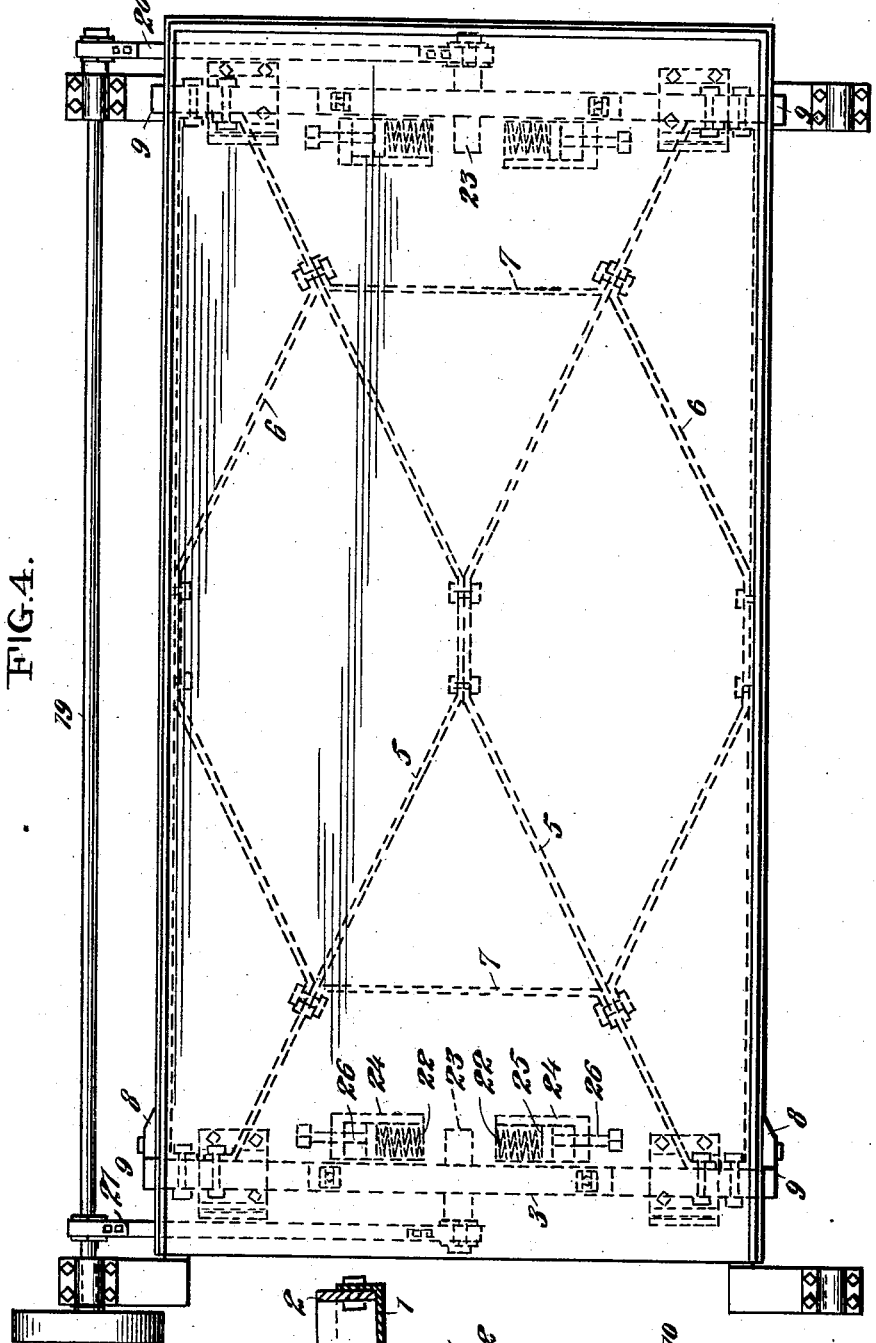
Figure 5:
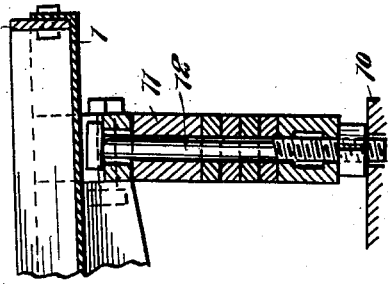

Figure 1 is a side elevation of an amalgamator embodying my invention. Fig. 2 is an end view of the same. Fig. 3 is a section on the line *x x* of Fig. 1. Fig. 4 is a plan of the amalgamator, and Fig. 5 is a section through the line *y y* of Fig. 3.

Referring to the drawings, 1 designates a pan closed at its sides and upper end, but open at the bottom. This pan preferably consists of copper silver-plated, and around the inner sides and upper end are wooden strips 2, which prevent amalgamation at the sides and upper end of the pan. This pan is removably arranged in a metal frame consisting of the end bars 3 and the side bars 4, and to make this frame perfectly rigid I employ braces 5, which extend from the end bars near their outer ends to the center and are bolted together, and brace-bars 6 extend from the side bars of the frame to the braces 5, and braces 7 connect the braces 5 at opposite sides of the center. The frame and pan are designed to be arranged on an incline, and to prevent any downward movement of the pan in the frame while in motion I provide blocks 8 on the sides of the pan, which engage against the upper sides of upward projections 9 on the ends of the lower bar 3. The upper bar 3 is also provided with upward projections 9.

The frame and pan are supported on a table 10, the legs of which are suitably braced. The support for the upper end consists of a bolster 11, which is preferably made in removable sections, so that it may be increased or diminished in height, as clearly shown in the drawings. These several sections are held together by bolts 12, which are countersunk into the upper end bar 3 of the pan-supporting frame, and the openings in this bar through which the bolts pass are elongated to permit the adjustment as to angle without binding the bolts. The bolts 12 pass into slots in the table 10. At the lower end of the frame a bolster 13 is attached to the lower end piece 3 by means of bolts 14, which pass into slots in the table-top.

Connected to the lower portion of the upper bolster is a slide-bar 15, and connected to the lower bolster is a slide-bar 16. For the sake of lightness these slide-bars are made tubular. The slide-bars move in boxings secured to the table-top, the said boxings consisting of lower sections 17 and upper sections 18, the sections being bolted together, as shown.

A lateral reciprocating motion is imparted to the pan from a crank-shaft 19, arranged at one side of the machine, and from the cranks of this shaft rods 20 and 21 extend to connections with pins on the slide-bars 15 and 16. The connections between said rods and the slide-bars or pins thereon are made in the form of adjustable boxings, so that the device may be tightened as the pins or boxings wear.

To prevent a too sudden jar at the extreme end of movements of the pan, I provide spring-cushions 22, designed to be engaged by projections 23, extended inward from the bolsters. These cushions are arranged in casings 24, attached to the table, and their inner ends abut against blocks 25, which are adjustable in the casings by means of screws 26, the purpose being to regulate the tension of the springs.

For convenience I have shown bearings for the crank-shaft at each side of the machine, so that the shaft may be shifted when necessary in setting up the machine.

In operation the machine will be placed in position in lieu of the stationary plates now used in stamp-mills and receive the slime or crushed ore from the battery constantly. The table or pan reciprocating back and forth causes the gold to amalgamate faster and more thoroughly than in a stationary pan, and the pan may be easily removed for cleaning.

Having thus described my invention, I claim as new and desire to secure by Letters Patent—

1. In an amalgamator, a skeleton frame, a pan supported in the frame, a table, a bolster secured to the frame and mounted to slide on the lower portion of the table, a bolster for the upper end of the frame consisting of removable sections, bolts for securing the sections together and to the frame, and means for imparting lateral sliding movement to the frame, substantially as specified.

2. In an amalgamator, a frame, a pan supported in the frame, an upper bolster, a lower bolster, a table on which the bolsters are mounted to slide, the said bolsters being bolted to the frame, slide-bars attached to the bolsters, boxings on the table in which said slide-bars move, a crank-shaft, and connections between the cranks of said shaft and the bolsters, substantially as specified.

3. In an amalgamator, a table, a frame for supporting a pan, upper and lower bolsters secured to said frame and adapted to slide on the table, means for imparting the sliding movement, blocks extended inward from the bolsters, springs supported on the table at opposite sides of said blocks, and means for adjusting the tension of said springs, substantially as specified.

In testimony whereof I have signed my name to this specification in the presence of two subscribing witnesses.

HUGH M. SMITH.

Witnesses:
   H. H. HERRIN,
   JAMES FORD.